(12) United States Patent
Yoshida

(10) Patent No.: US 9,563,669 B2
(45) Date of Patent: Feb. 7, 2017

(54) CLOSED ITEMSET MINING USING DIFFERENCE UPDATE

(75) Inventor: Issei Yoshida, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

(21) Appl. No.: 13/494,599

(22) Filed: Jun. 12, 2012

(65) Prior Publication Data
US 2013/0332431 A1    Dec. 12, 2013

(51) Int. Cl.
*G06F 17/30* (2006.01)

(52) U.S. Cl.
CPC ................ *G06F 17/30539* (2013.01)

(58) Field of Classification Search
CPC .................................. G60F 17/30539
USPC ......................................... 707/698
See application file for complete search history.

(56) References Cited

U.S. PATENT DOCUMENTS

| | | | |
|---|---|---|---|
| 6,185,559 B1* | 2/2001 | Brin et al. | ..................... 707/758 |
| 6,581,063 B1* | 6/2003 | Kirkman | |
| 7,370,054 B1* | 5/2008 | Martin | ............. G06F 17/30949 707/747 |
| 7,584,187 B2 | 9/2009 | Yoshida | |
| 8,954,468 B2* | 2/2015 | Yoshida | ............ G06F 17/30539 707/776 |
| 8,964,742 B1* | 2/2015 | Mizrahi | .................. H04L 49/30 370/356 |
| 2006/0112121 A1* | 5/2006 | McKenney | ....... G06F 17/30958 707/E17.011 |
| 2006/0174024 A1* | 8/2006 | Chi et al. | ...................... 709/231 |
| 2007/0011162 A1* | 1/2007 | Yoshida | ............ G06Q 30/0201 707/999.006 |
| 2007/0198548 A1* | 8/2007 | Lee | ............................... 707/100 |
| 2007/0239694 A1 | 10/2007 | Singh et al. | |
| 2008/0201340 A1* | 8/2008 | Thonangi | ..................... 707/100 |
| 2009/0313706 A1* | 12/2009 | Zhang et al. | ................... 726/30 |
| 2010/0010989 A1* | 1/2010 | Li et al. | ............................. 707/5 |
| 2010/0174670 A1* | 7/2010 | Malik et al. | .................... 706/12 |
| 2010/0179955 A1* | 7/2010 | Wu et al. | ..................... 707/748 |
| 2010/0332430 A1 | 12/2010 | Caraviello et al. | |
| 2011/0184922 A1* | 7/2011 | Lee | .............................. 707/693 |
| 2011/0225168 A1* | 9/2011 | Burroughs et al. | ........... 707/747 |

OTHER PUBLICATIONS

Wang et al., "Closet+: Searching for the Best Strategies for Mining Frequent Closed Itemsets", 2003, ACM.*
M. J. Zaki, et al. "CHARM: An Efficient Algorithm for Closed Itemset Mining," in Proceedings of the 2nd SIAM International Conference on Data Mining (SDM 2002), p. 457-473; 2002.

* cited by examiner

*Primary Examiner* — Apu Mofiz
*Assistant Examiner* — Sheryl Holland
(74) *Attorney, Agent, or Firm* — Cantor Colburn LLP; Vazken Alexanian

(57) ABSTRACT

Embodiments are directed to, for a database comprising a set of transactions, with each transaction including an itemset comprising one or more individual items, obtaining a set of all closed frequent itemsets by checking frequencies of transaction sets, wherein a given itemset, I, is frequent where at least some threshold number ($\mu$) of transactions contain I, and wherein the given itemset I is closed wherein it is impossible to add any item to I without changing the frequency thereof.

20 Claims, 11 Drawing Sheets

Algorithm 3 NEXT2($\mathcal{D}, k, \mu, S$)

1: // $S$ has a linked list structure.
2: // The first element in $S$ is denoted by $S.first$.
3: // The next element of $I$ in $S$ is denoted by $I.next$.
4: // For the last element $J$ of $S$, $J.next = null$.
5: $I = S.first$
6: while $I$ is not $null$ do
7:   if $x_k \in I$ then
8:     break // All of the elements of $C(\mathcal{D}_{k-1})$ have been examined.
9:   end if
10:   if $|\psi_k(I \cup \{x_k\})| \geq \mu$ then
11:     $I = \text{UPDATE}(S, I, x_k)$
12:   else
13:     $I_{prev} = \emptyset$
14:     while $I$ is not $null$ and $I_{prev} \subseteq I$ do
15:       $I_{prev} = I, I = I.next$
16:     end while
17:   end if
18: end while
19: return $S$

FIG. 3

Algorithm 4 UPDATE($S, I, \varphi_k$)

1: // Maintain a global hash table to store
2: // the mapping $t(I) \mapsto I$ for each $I \in S$.
3: // $h(I) := \sum_{t \in t(I)} t.id$ denotes the hash key for $I$.
4: // hence collisions may occur.
5: $\tilde{I} = I \cup \{\varphi_k\}$, $I_M = \tilde{I}$
6: for each $J \in S$ s.t. $h(J) = h(\tilde{I})$ do
7:    if $|t_k(J)| = |t_k(J \cup \tilde{I})|$ and $|t_k(J)| = |t_k(\tilde{I})|$ then
8:       $I_M = I_M \cup J$
9:       remove $J$ from $S$
10:    end if
11: end for
12: insert $I_M$ in $S$ at the tail of $S$
13: return $I_{next}$

FIG. 4

CLOSED ITEMSET MINING USING DIFFERENCE UPDATE

FIELD OF INVENTION

The present disclosure relates generally to data mining, and more specifically, to closed frequent itemset mining.

DESCRIPTION OF RELATED ART

Itemset mining has been used for various applications. For example, frequent itemset mining has been studied in data mining research in connection with transactional databases. Closed itemset mining was introduced to address the problem of applications or computing devices being unable to process a number of itemsets under consideration when an associated threshold for terming an itemset as 'frequent' is decreased or is small.

BRIEF SUMMARY

According to one or more embodiments of the present disclosure, an apparatus comprises at least one processor, and memory storing instructions that, when executed by the at least one processor, cause the apparatus to, for a database comprising a set of transactions, with each transaction including an itemset comprising one or more individual items, obtain a set of all closed frequent itemsets by checking frequencies of transaction sets, wherein a given itemset, I, is frequent where at least some threshold number ($\mu$) of transactions contain I, and wherein the given itemset I is closed wherein it is impossible to add any item to I without changing the frequency thereof.

According to one or more embodiments of the present disclosure, a non-transitory computer program product comprises a computer readable storage medium having computer readable program code stored thereon that, when executed by a computer, perform a method of closed itemset mining for database comprising a set of transactions, with each transaction including an itemset comprising one or more individual items, wherein the method comprises obtaining a set of all closed frequent itemsets by checking frequencies of transaction sets, wherein a given itemset, I, is frequent where at least some threshold number ($\mu$) of transactions contain I, and wherein the given itemset I is closed wherein it is impossible to add any item to I without changing the frequency thereof.

According to one or more embodiments of the present disclosure, a system comprises a computing device configured to obtain a set of all closed frequent itemsets by checking frequencies of transaction sets, wherein a given itemset, I, is frequent where at least some threshold number ($\mu$) of transactions contain I, and wherein the given itemset I is closed wherein it is impossible to add any item to I without changing the frequency thereof.

According to one or more embodiments of the present disclosure, a method comprises obtaining, by a computing device, a set of all closed frequent itemsets by checking frequencies of transaction sets, wherein a given itemset, I, is frequent where at least some threshold number ($\mu$) of transactions contain I, and wherein the given itemset I is closed wherein it is impossible to add any item to I without changing the frequency thereof.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the disclosure are apparent from the following detailed description taken in conjunction with the accompanying drawings in which:

FIG. 3 illustrates an exemplary algorithm in accordance with one or more aspects of this disclosure.

FIG. 4 illustrates an exemplary algorithm in accordance with one or more aspects of this disclosure.

DETAILED DESCRIPTION

Figure 1:
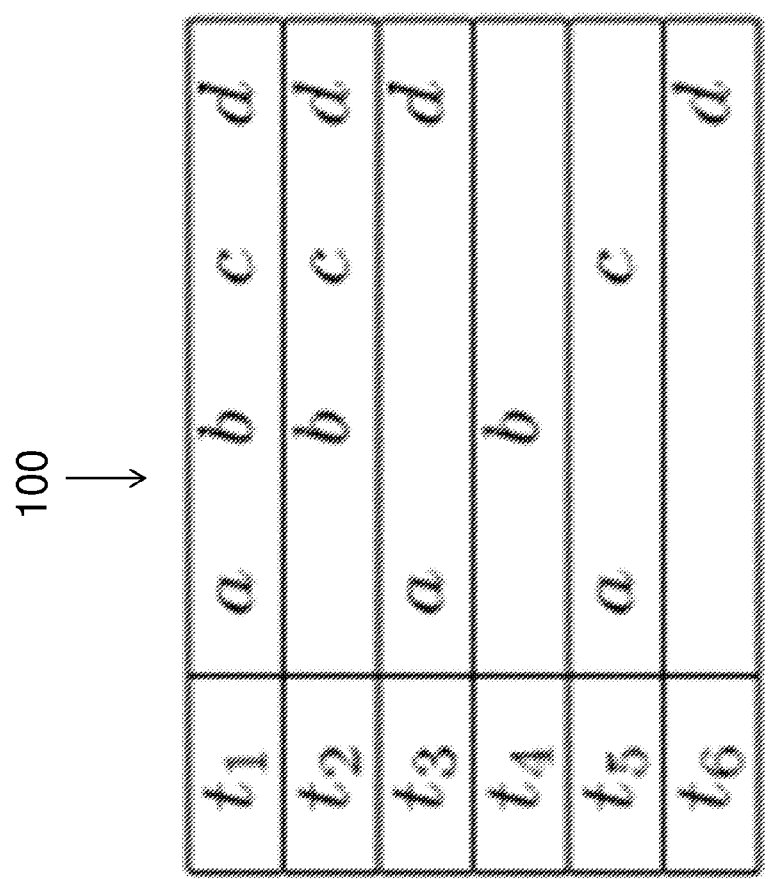
FIG. 1 illustrates an exemplary database in accordance with one or more aspects of this disclosure.

In accordance with various aspects of the disclosure, an efficient comparison of transactions may be obtained. For example, a check of a frequency of a transaction set may be performed, potentially instead of checking for a theoretical inclusion of a set of transaction sets.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

Referring to FIG. 1, an exemplary database 100 is shown. The database 100 is shown as including a set of transactions. Specifically, database 100 includes transactions $t_1$-$t_6$. In some embodiments, a database may include more or less than six transactions.

Each of the transactions $t_1$-$t_6$ may include one or more items. For example, each of the transactions $t_1$-$t_6$ may be made up of, or include, one or more of items a, b, c, and d. As shown in FIG. 1, transaction $t_1$ includes items a, b, c, and d. Transaction $t_2$ includes items b, c, and d. Transaction $t_3$ includes items a and d. Transaction $t_4$ includes item b. Transaction $t_5$ includes items a and c. Transaction $t_6$ includes item d. In some embodiments, a transaction may include more than four items, or more generally, any number of items.

An itemset may be defined as a set of items (e.g., one or more of items a, b, c, d). In relation to database 100, the set of items associated with each of the transactions $t_1$-$t_6$ may be referred to as an itemset.

An itemset I may be termed frequent if at least some threshold number ($\mu$) of transactions contain I. The frequency of an itemset I may correspond to the number of instances of the itemset. For example, if the itemset I={a, d}, the frequency of I is two with respect to database 100, since transactions $t_1$ and $t_3$ contain I.

An itemset I may be termed 'closed' if it is impossible to add any item to I without changing the frequency. As an example taking into consideration the database 100, the itemset I={b, d} is not closed because: (1) the frequency of I is two (since $t_1$ and $t_2$ contain I), and (2) the frequency of an itemset $I_1$={b, c, d} is also two. In other words, adding item 'c' to the itemset I to obtain the itemset $I_1$ did not result in a change in the frequency between I and $I_1$. The itemset $I_1$ is closed, because adding item 'a' would result in a change in frequency (e.g., an itemset including items a, b, c, and d would have a frequency of one, corresponding to the transaction $t_1$ in database 100).

It may be possible to recover all of the information about frequent itemsets from all the frequent closed itemsets. In other words, no information may be lost in (just) considering frequent closed itemsets. In this regard, one or more data structures may be defined. A first data structure, S, may serve as a linked list that may maintain candidate itemsets. A second data structure, H, may serve as a hash table that may provide for an efficient search of transaction sets.

In some embodiments, S may be incrementally updated with respect to each item (e.g., items a, b, c, and d). After all the items have been processed, S may be equal to the set of all closed frequent itemsets.

Figure 2:
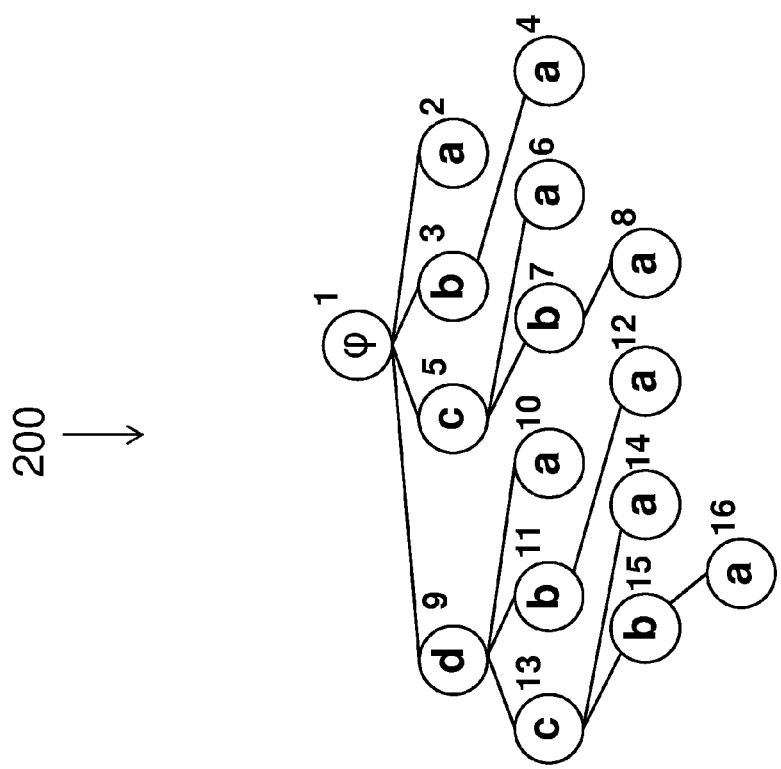
FIG. 2 illustrates an exemplary tree in accordance with one or more aspects of this disclosure.

FIG. 2 illustrates an exemplary tree 200. The tree 200 may enumerate or represent some or all of the possible itemsets in a database, such as the database 100. The nodes of the tree 200 may correspond to an itemset. For example, the node numbered '7' may correspond to an itemset={b, c}. Similarly, the node numbered '10' may correspond to an itemset={a, d}. The node numbered '1' may be associated with the empty set, denoted by the letter phi ($\phi$). The node numbered '1' may serve as the root or apex of the tree.

Still referring to FIG. 2, each itemset of the tree 200 may be examined in order or sequence based on the number or other identifier of the associated node. For example, candidate itemsets corresponding to the nodes numbered one through sixteen may be examined sequentially. As such, the candidate itemsets may be examined as {emptyset}, followed by {a}, followed by {b}, followed by {a, b}, followed by {c}, followed by {a,c}, followed by {b,c}, followed by {a, b, c}, followed by {d}, followed by {a, d}, followed by {b, d}, . . . followed by {a, b, c, d}.

In terms of the examination, one or more tests may be performed. For example, a first test may include checking for a given node whether the corresponding itemset is frequent. A second test may include checking for the given node whether the itemset is closed.

As an illustrative example of the first test (e.g., checking whether an itemset is frequent), and referring to the database 100, if the threshold is predetermined to be equal to two (e.g., $\mu$=2), then the nodes numbered '4', '8', '12', '14', and '16' (corresponding to itemsets {a, b}, {a, b, c}, {a, b, d}, {a, c, d}, and {a, b, c, d}, respectively) may be ignored or rejected.

FIG. 3 illustrates an algorithm referred to as "Next2." The Next2 algorithm of FIG. 3 may be compared and contrasted with the counterpart "Next" and "Next2" algorithms described in U.S. Pat. No. 7,584,187. U.S. Pat. No. 7,584,187 is fully incorporated herein by reference.

Referring to FIG. 3, line 10 of the Next2 algorithm may check to determine if the frequency of the set of transactions including a given item ($x_k$), combined with an itemset I that serves as a cursor that points to the current itemset in S, is greater than the threshold $\mu$. If it is not, lines 13-16 of the Next2 algorithm of FIG. 3 may execute. Lines 13-16 may correspond to the property that if [I U {$x_k$}] is not frequent, then [J U {$x_k$}] also is not frequent, where J is a descendant itemset of I. If the check of line 10 of Next2 is affirmed or passes, then an Update algorithm (shown in FIG. 4, and described further below) may be called to, e.g., determine if a given itemset is closed (e.g., the second test described above).

Figure 5:
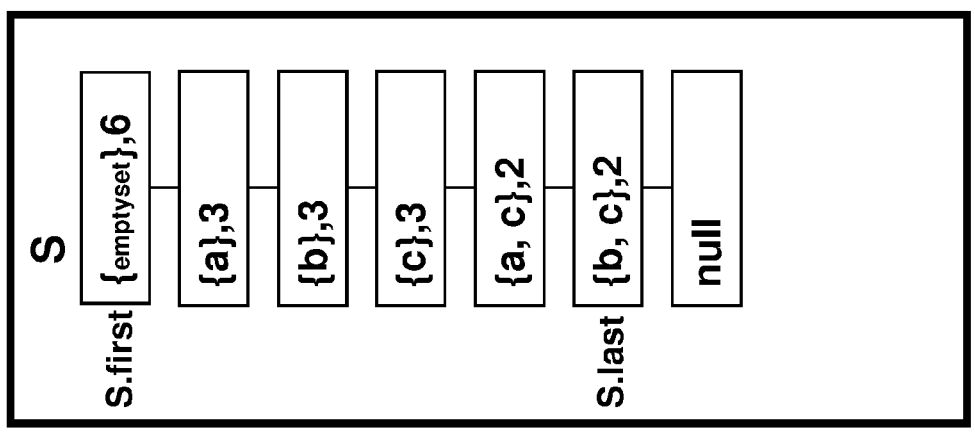
FIG. 5 illustrates an exemplary linked list in accordance with one or more aspects of this disclosure.

As described above, the data structure S may store the candidate frequent closed itemsets. The data structure S may also store the frequencies associated with those itemsets. FIG. 5 illustrates a version of S just after node 8 (corresponding to the itemset {a, b, c}) is processed in accordance with the Next2 and Update algorithms of FIGS. 3-4. Each element of S may include an ordered pair, where the first member of the pair corresponds to the itemset and the second member of the pair corresponds to the frequency of that itemset.

In terms of a potential merger of a given itemset with other itemsets in S, a hash table H may be used. The hash table H may maintain a mapping between hash values and corresponding itemsets of S. The hash value h(I) for an itemset I may be defined using any hash algorithm or structure, such as the sum of the transaction identifiers (IDs) or numbers that contain I, where it may be assumed that each transaction is assigned a unique ID. For example, and referring to database 100, when I={b, c}, the value of h(I)=1+2=3 because transaction t1 has a transaction ID number of '1' and transaction t2 has a transaction ID number of '2', and both transactions t1 and t2 include the itemset {b, c}. Similarly, h({b, c, d})=1+2=3. Since itemset {b, c} and itemset {b, c, d} have the same hash value, these itemsets may be able to be merged, as described in further detail below.

In some instances, the hash values in hash table H might not be unique. In such cases, a check may be performed against all the itemsets having a given, non-unique hash value.

Figure 6:
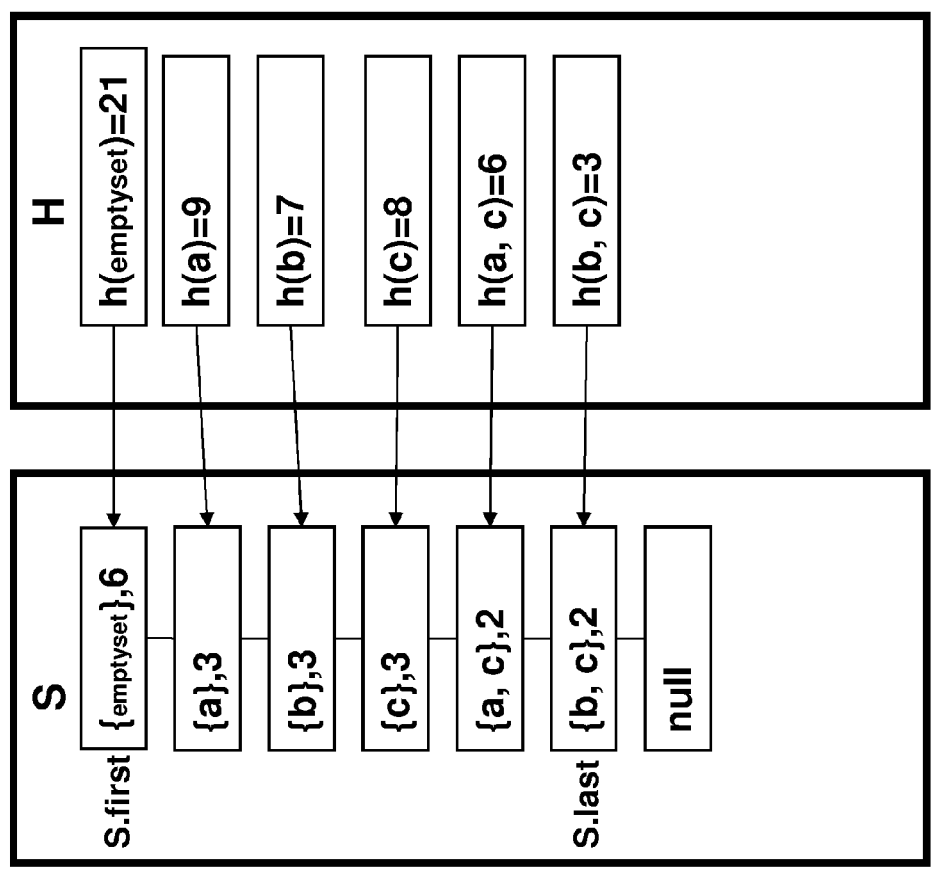
FIG. 6 illustrates an exemplary hash table and linked list in accordance with one or more aspects of this disclosure.

FIG. 6 illustrates a mapping of the hash table H and the data structure/linked list S of FIG. 5. As shown, the hash table H may maintain a hash value h(I) for each itemset I in S, and a link may be established between the hash values and the itemsets.

Figure 7:
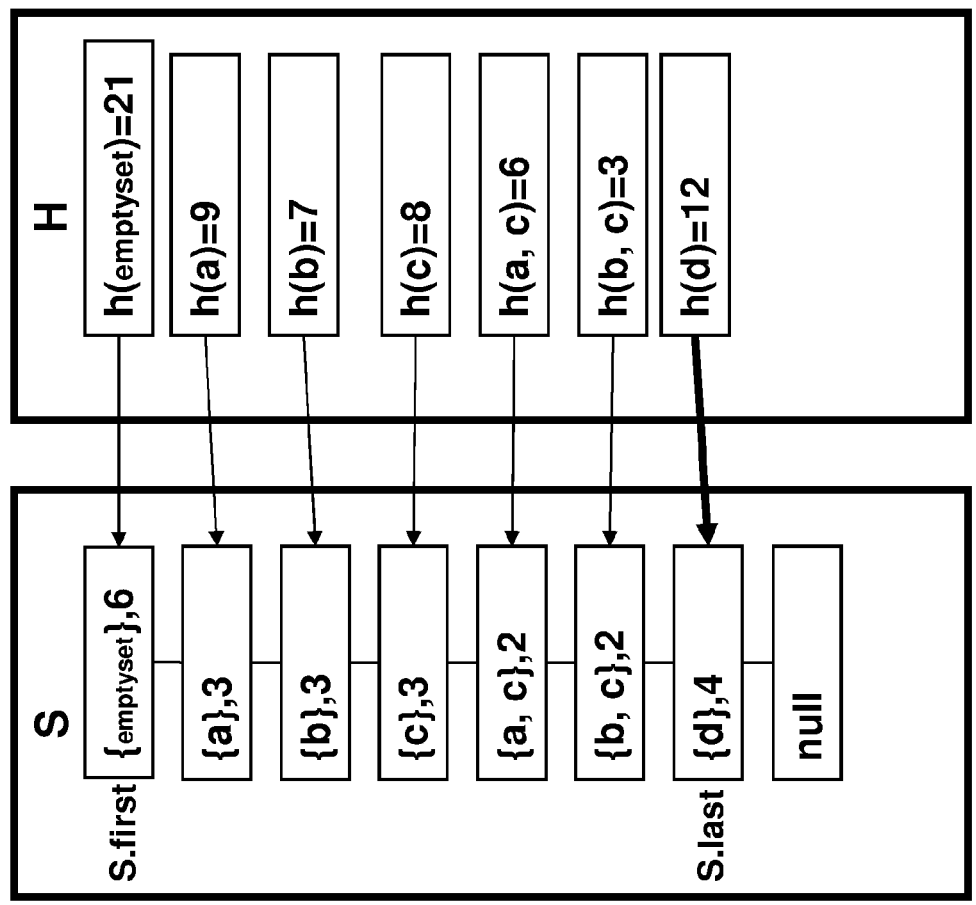
FIG. 7 illustrates an exemplary hash table and linked list in accordance with one or more aspects of this disclosure.

Assuming that the execution of the Next2 (and Update) algorithm continues/resumes with the node numbered 9 (corresponding to the itemset {d}), since there is no itemset in S that has a corresponding hash value that is h({d}), {d} may be added to S at the end or tail of S. H may be updated to point to {d} in S. The addition of {d} to S and the addition of h({d}) to H is shown in FIG. 7, and may generally correspond to the functionality of lines 5, 6, and 11-13 of the Update algorithm of FIG. 4.

Figure 8:
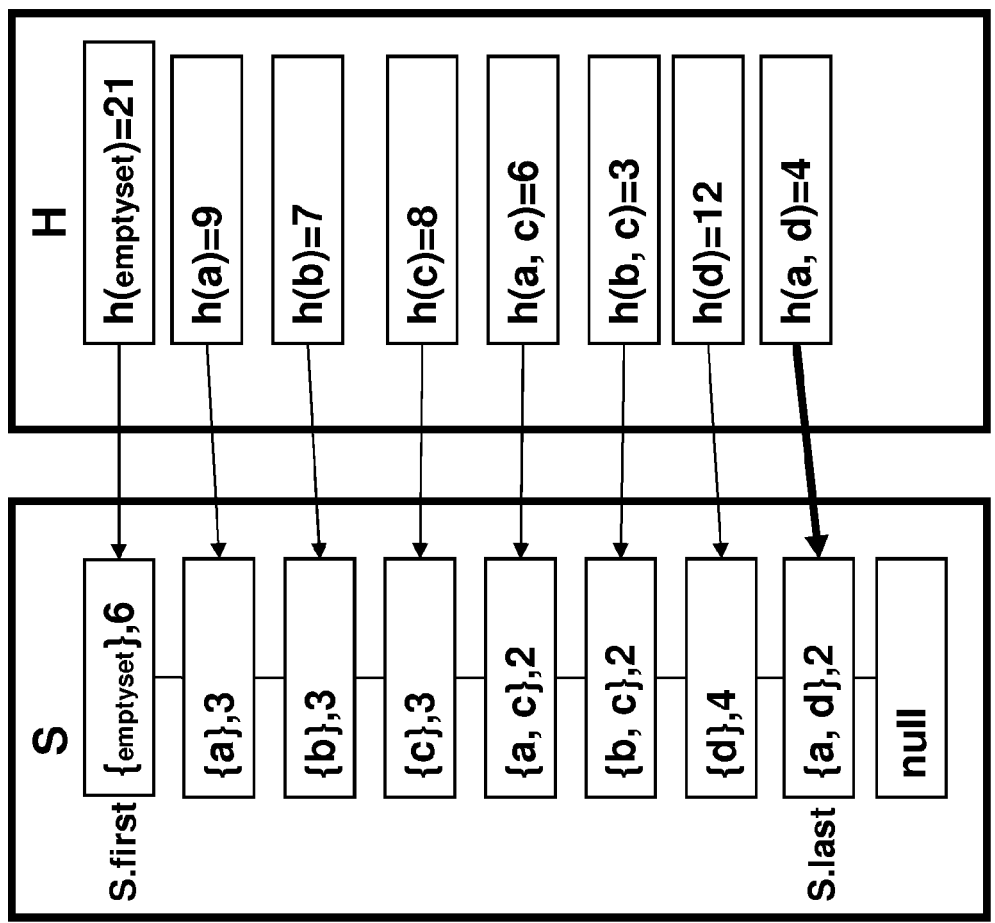
FIG. 8 illustrates an exemplary hash table and linked list in accordance with one or more aspects of this disclosure.

FIG. 8 reflects the state of S and H following the processing of node 10 (corresponding to the itemset {a, d}) in accordance with the Next2 and Update algorithms of FIGS. 3-4. The hash value of {a, d} is given by h({a, d})=1+3=4. As the hash value of four did not exist in H (prior to the processing of node 10), itemset {a, d} was added to S, and the corresponding hash value was added to H, as shown in FIG. 8.

Figure 9:
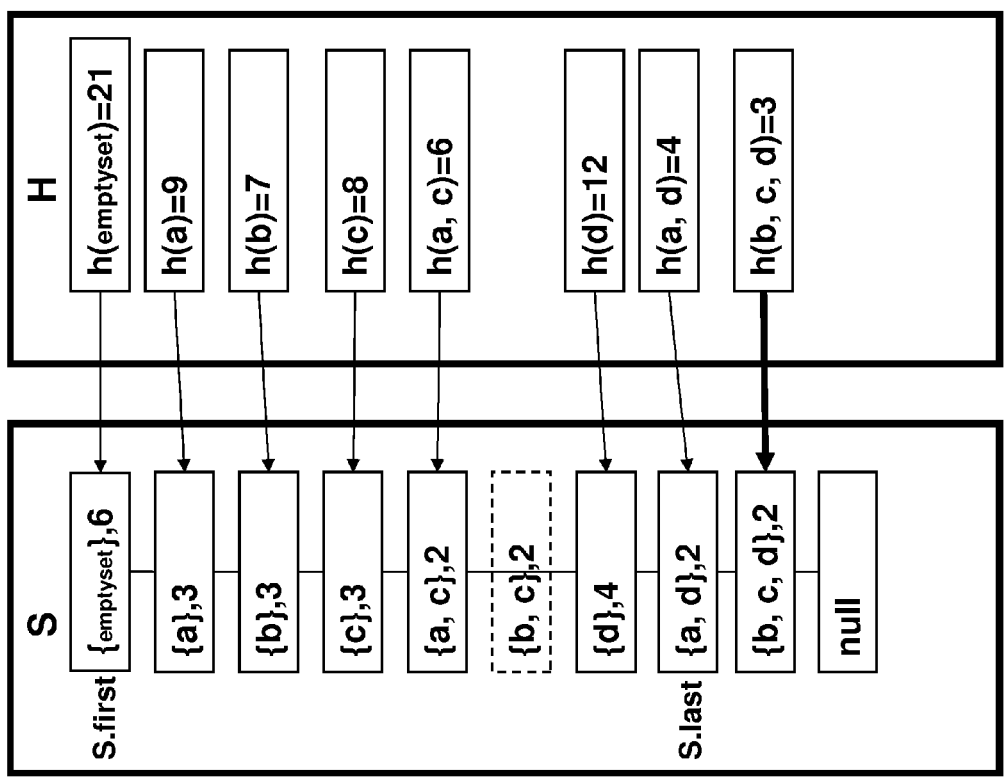
FIG. 9 illustrates an exemplary hash table and linked list in accordance with one or more aspects of this disclosure.

A merging operation may be obtained when reaching node 11 (corresponding to the itemset {b, d}) since h({b, d})=h({b, c})=3 and {b, c} already exists in S. Referring to the Update algorithm of FIG. 4, in line 5, I or Itilda may be set equal to {b, d} in this example, and $I_M$ may be set equal to Itilda. Line 6 of Update may correspond to checking for equality in terms of the hash values as described above, wherein in this example h({b, d})=h({b, c})=3. Line 7 of Update may check for two conditions for a merger to be performed in line 8. The first condition may be that the frequency of the set of transactions containing J (which corresponds to the itemset {b, c} in this example) is equal to the frequency of the set of transactions containing J or Itilda (corresponding to the itemset {b, c, d} in this example). The second condition may be that the frequency of the set of transactions containing J (which corresponds to the itemset {b, c} in this example) is equal to the frequency of the set of transactions containing Itilda (corresponding to the itemset {b, d} in this example). If both conditions are satisfied, then the itemset J (corresponding to the itemset {b, c} in this example) may be merged with $I_M$ (corresponding to the itemset {b, d} in this example) in line 8 of Update to obtain a new $I_M$ (corresponding to the itemset {b, c, d} in this example). In line 9 of Update, J (corresponding to itemset {b, c} in this example) may be removed from S. In line 12 of Update, (the new) $I_M$ (corresponding to itemset {b, c, d}) may be inserted at the end or tail of S. In line 13, the next element of I in S may be returned to facilitate subsequent processing in accordance with Next2. FIG. 9 reflects the removal of itemset {b, c} from S, as well as the addition of itemset {b, c, d} to S and its associated hash value to H.

The algorithms described above may be repeated for the remaining nodes of the tree 200. More generally, the algorithms described above may be applied to (e.g., sequentially applied to) a tree of any type or structure, including any number of nodes.

Figure 10:
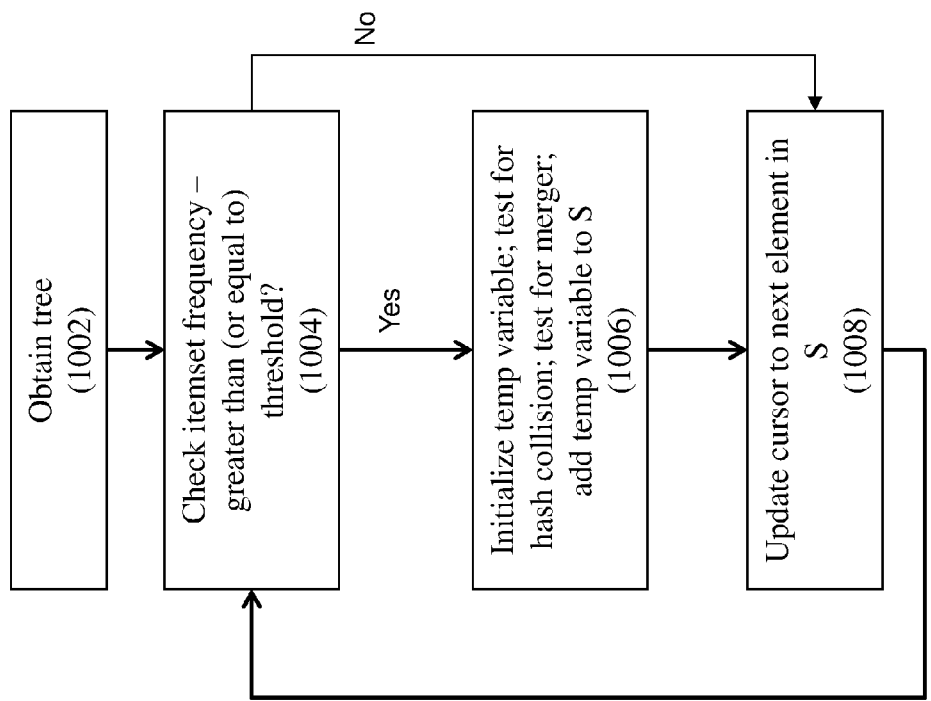
FIG. 10 illustrates an exemplary method in accordance with one or more aspects of this disclosure.

FIG. 10 illustrates a method for obtaining a set of all closed frequent itemsets. The method of FIG. 10 may correspond to, or include, an execution of the Next2 and Update algorithms of FIGS. 3-4.

In block 1002, a tree representing all the possible itemsets in a database may be constructed or obtained. For example, the tree 200 of FIG. 2 may be obtained based on an availability of four items arbitrarily labeled a, b, c, and d.

In block 1004, for a given itemset of the tree, a check may be performed to determine if the itemset is frequent, or appears in a number of transactions greater than (or equal to) a threshold. For example, line 10 of the Next2 algorithm may check to see that an itemset defined by a cursor I that points to a current itemset in S in combination with an item $x_k$ is greater than or equal to a threshold μ. If the itemset is not frequent ("No" path out of block 1004), processing may proceed with the next itemset in S (corresponding to block 1008 in FIG. 10), taking into consideration that any descendants of I also are not frequent (e.g., lines 13-16 of Next2). Otherwise, if the itemset is frequent ("Yes" path out of block 1004), flow may proceed to block 1006.

In block 1006, a temporary variable (e.g., $I_M$) may be initialized with a value corresponding to the current itemset I in S in combination with an item $x_k$ (e.g., line 5 of Update). As part of block 1006, a test for a collision in terms of hash values may be performed (e.g., line 6 of Update), and if a collision is present, a test for a merger of itemsets via the temporary variable may be performed (e.g., lines 7-9 of Update). The temporary variable may be added to S. Flow may proceed from block 1006 to block 1008.

In block 1008, the cursor corresponding to I may be updated to point to the next element in S. Flow may proceed from block 1008 to block 1004, until all elements of S are accounted for.

The Next2 algorithm of incorporated U.S. Pat. No. 7,584, 187 at FIG. 9 (line number 9) compares two transaction sets t(Iu) and t(I~), but does not provide for a way to efficiently search for such an Iu. Conversely, embodiments of this disclosure compare frequencies (as opposed to transaction sets) of two pairs of itemsets. As such, embodiments of this disclosure might not store transaction sets of all candidate itemsets. Efficiency gains may be realized, particularly as the number of items or itemsets increases or becomes large. Such efficiency gains may be due at least in part to a reduction in terms of utilized processing resources.

Figure 11:
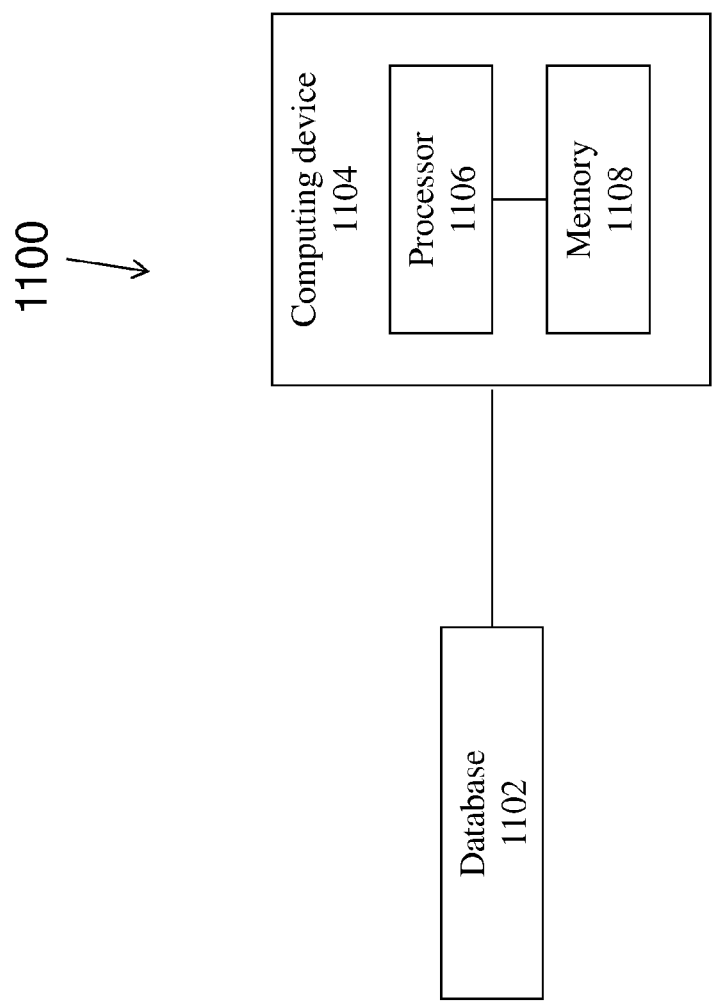
FIG. 11 illustrates an exemplary computing system in accordance with one or more aspects of this disclosure.

FIG. 11 illustrates a computing system 1100 in accordance with one or more embodiments of this disclosure. The system 1100 may include one or more databases. For example, a database 1102 is shown. In some embodiments, the database 1102 may correspond to the database 100 of FIG. 1. The database 1102 may store one or more itemsets, such as one or more transactions. The database 1102 may store one or more items (e.g., items a, b, c, and d). The system 1100 may include one or more devices, such as a computing device 1104. The computing device 1104 may include one or more processors, such as a processor 1106. The computing device 1104 may include memory, such as a memory 1108. The memory 1108 may store instructions that, when executed by the one or more processors (e.g., processor 1106), cause the computing device 1104 to perform one or more of the methodological acts described herein. For example, the instructions, when executed, may cause the computing device 1104 to obtain a set of all closed frequent itemsets by checking frequencies of transaction sets. The computing device 1104 may access items or transactions stored in the database 1102 to obtain the itemsets.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

As will be appreciated by one skilled in the art, aspects of this disclosure may be embodied as a system, method or computer program product. Accordingly, aspects of the present disclosure make take the form of an entirely hardware embodiment, an entirely software embodiment (including firmware, resident software, micro-code, etc.) or an embodiments combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming language, including an object oriented programming language such as Java, Smalltalk, C++ or the like and conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, an apparatus or system may comprise at least one processor, and memory storing instructions that, when executed by the at least one processor, cause the apparatus or system to perform one or more methodological acts as described herein. In some embodiments, the memory may store data, such as one or more data structures, metadata, etc.

Embodiments of the disclosure may be tied to particular machines. For example, in some embodiments one or more devices may process candidate itemsets to obtain one or more frequently closed itemset(s). In some embodiments, the one or more devices may include a computing device, such as a personal computer, a laptop computer, a mobile device (e.g., a smartphones), a server, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There may be many variations to the diagram or the steps (or operations) described therein without departing from the spirit of the disclosure. For instance, the steps may be performed in a differing order or steps may be added, deleted or modified. All of these variations are considered a part of the disclosure.

It will be understood that those skilled in the art, both now and in the future, may make various improvements and enhancements which fall within the scope of the claims which follow.

What is claimed is:

1. An apparatus comprising:
   at least one processor;
   a database comprising a plurality of transactions, wherein a transaction in the database comprises an itemset, which is a pattern of one or more items;
   memory storing instructions that, when executed by the at least one processor, cause the apparatus to generate a set of result itemsets that are closed frequent itemsets, each result itemset has a frequency that changes if an item is added to said result itemset, wherein the memory comprises instructions to:
   initialize the set of result itemsets with an empty itemset;
   generate a set of candidate itemsets to compare with the result itemsets;
   determine a frequency of a candidate itemset from the set of candidate itemsets, wherein the frequency of an itemset is a number of times the itemset occurs in the transactions of the database;
   compare the frequency of the candidate itemset with a predetermined threshold;
   in response to the frequency of the candidate itemset being above the predetermined threshold, update the set of result itemsets comprising:
      generate a first temporary itemset that comprises a union of a first item from the candidate itemset and all the items from a first itemset from the set of result itemsets;
      determine a hash-value of the first temporary itemset;
      in response to the set of result itemsets not including a result itemset that has an identical hash-value as the first temporary itemset, add the first temporary itemset to the result itemset and repeat updating the result itemsets using a second item from the candidate itemset; and
      in response to identifying the result itemset that has the identical hash value as the first temporary itemset:

determine a first frequency of the first temporary itemset;

determine a second frequency of a second temporary itemset that comprises a union of the items from the identified result itemset and the first temporary itemset;

determine a third frequency of the identified result itemset; and in response to the first frequency, the second frequency, and the third frequency all being equal, replace the identified result itemset from the result itemsets with the second temporary itemset and repeat the update using the second item from the candidate itemset.

2. The apparatus of claim 1, wherein the hash value of an itemset is a sum of transaction identifications of the transactions in which the itemset is present.

3. The apparatus of claim 1, wherein the instructions, when executed by the at least one processor, cause the apparatus to:

disregard the candidate itemset for inclusion in the result itemsets in response to the frequency of the candidate itemset being lesser than the predetermined threshold.

4. The apparatus of claim 1, wherein the instructions, when executed by the at least one processor, cause the apparatus to:

disregard a second candidate itemset that is a descendant of the candidate itemset for inclusion in the result itemsets in response to the frequency of the candidate itemset being lesser than the predetermined threshold.

5. The apparatus of claim 1, wherein the result itemset is stored in a linked list.

6. The apparatus of claim 5, wherein the linked list comprises a plurality of nodes, wherein each respective node includes a result itemset and a frequency of the result itemset.

7. The apparatus of claim 6, wherein the instructions, when executed by the at least one processor, cause the apparatus to:

in response to the addition of an itemset to the result itemset:
add the hash value corresponding to the added itemset to a hash table; and
link the hash value to the added itemset in the linked list.

8. The apparatus of claim 5, wherein replacement of the identified result itemset with the second temporary itemset comprises:

removal of the result itemset included in the linked list, and
addition of a new node corresponding to the second temporary itemset to the linked list.

9. A non-transitory computer program product comprising a computer readable storage medium having computer readable program code stored thereon that, when executed by a computer, perform a method for identifying a set of result itemsets that are closed frequent itemsets from a database, the database comprising a plurality of transactions, wherein a transaction in the database comprises an itemset, which is a pattern of one or more individual items, and wherein each result itemset has a frequency that changes if an item is added to said result itemset, wherein the method comprises:

initializing the set of result itemsets with an empty itemset;

generating a set of candidate itemsets to compare with the result itemsets;

determining a frequency of a candidate itemset from the set of candidate itemsets, wherein the frequency of an itemset is a number of times the itemset occurs in the transactions of the database;

comparing the frequency of the candidate itemset with a predetermined threshold;

in response to the frequency of the candidate itemset being above the predetermined threshold, updating the set of result itemsets comprising:

generating a first temporary itemset that comprises a union of a first item from the candidate itemset and all the items from a first itemset from the set of result itemsets;

determining a hash-value of the first temporary itemset;

in response to the set of result itemsets not including a result itemset that has an identical hash-value as the first temporary itemset, adding the first temporary itemset to the result itemset and repeating the update using a second item from the candidate itemset; and in response to identifying the result itemset that has the identical hash value as the first temporary itemset:

determining a first frequency of the first temporary itemset;

determining a second frequency of a second temporary itemset that comprises a union of the items from the identified result itemset and the first temporary itemset;

determining a third frequency of the identified result itemset; and in response to the first frequency, the second frequency, and the third frequency all being equal, replacing the identified result itemset from the result itemsets with the second temporary itemset and repeating the update using the second item from the candidate itemset.

10. The non-transitory computer program product of claim 9, wherein the hash value of an itemset is a sum of transaction identifications of the transactions in which the itemset is present.

11. The non-transitory computer program product of claim 9, wherein the method further comprises:

disregarding the candidate itemset for inclusion in the result itemsets in response to the frequency of the candidate itemset being lesser than the predetermined threshold.

12. The non-transitory computer program product of claim 9, wherein the method further comprises:

disregarding a second candidate itemset that is a descendant of the candidate itemset for inclusion in the result itemsets in response to the frequency of the candidate itemset being lesser than the predetermined threshold.

13. The non-transitory computer program product of claim 9, wherein the result itemset is stored in a linked list, wherein the linked list comprises a plurality of nodes, wherein each respective node includes a result itemset and a frequency of the result itemset.

14. The non-transitory computer program product of claim 13, wherein replacing the identified result itemset with the second temporary itemset comprises:

removing of the result itemset included in the linked list, and
adding a new node corresponding to the second temporary itemset to the linked list.

15. A method for identifying a set of result itemsets that are closed frequent itemsets from a database, wherein each result itemset has a frequency that changes if an item is added to said result itemset, the database comprises a plurality of transactions, and wherein a transaction in the database comprises an itemset, which is a pattern of one or more individual items, the method comprising:

initializing the set of result itemsets with an empty itemset;

generating a set of candidate itemsets to compare with the result itemsets;

determining a frequency of a candidate itemset from the set of candidate itemsets, wherein the frequency of an itemset is a number of times the itemset occurs in the transactions of the database;

comparing the frequency of the candidate itemset with a predetermined threshold;

in response to the frequency of the candidate itemset being above the predetermined threshold, updating the set of result itemsets comprising:

generating a first temporary itemset that comprises a union of a first item from the candidate itemset and all the items from a first itemset from the set of result itemsets;

determining a hash-value of the first temporary itemset;

in response to the set of result itemsets not including a result itemset that has an identical hash-value as the first temporary itemset, adding the first temporary itemset to the result itemset and repeating the update using a second item from the candidate itemset; and in response to identifying the result itemset that has the identical hash value as the first temporary itemset:

determining a first frequency of the first temporary itemset;

determining a second frequency of a second temporary itemset that comprises a union of the items from the identified result itemset and the first temporary itemset;

determining a third frequency of the identified result itemset; and in response to the first frequency, the second frequency, and the third frequency, all being equal, replacing the identified result itemset from the result itemsets with the second temporary itemset and repeating the update using the second item from the candidate itemset.

16. The method of claim 15, wherein the hash value of an itemset is a sum of transaction identifications of the transactions in which the itemset is present.

17. The method of claim 15, wherein the method further comprises:

disregarding the candidate itemset for inclusion in the result itemsets in response to the frequency of the candidate itemset being lesser than the predetermined threshold.

18. The method of claim 15, wherein the method further comprises:

disregarding a second candidate itemset that is a descendant of the candidate itemset for inclusion in the result itemsets in response to the frequency of the candidate itemset being lesser than the predetermined threshold.

19. The method of claim 15, wherein the result itemset is stored in a linked list, wherein the linked list comprises a plurality of nodes, wherein each respective node includes a result itemset and a frequency of the result itemset.

20. The method of claim 19, wherein replacing the identified result itemset with the second temporary itemset comprises:

removing of the result itemset included in the linked list, and adding a new node corresponding to the second temporary itemset to the linked list.

* * * * *